United States Patent
Luk-Zilberman et al.

(10) Patent No.: US 12,225,027 B2
(45) Date of Patent: Feb. 11, 2025

(54) SYSTEM AND METHOD FOR DETECTION OF ABNORMAL DEVICE TRAFFIC BEHAVIOR

(71) Applicant: Armis Security Ltd., Tel Aviv-Jaffa (IL)

(72) Inventors: Evgeny Luk-Zilberman, Herzliya (IL); Gil Ben Zvi, Hod Hasharon (IL); Tom Hanetz, Tel Aviv (IL); Ron Shoham, Tel Aviv (IL); Yuval Friedlander, Petah-Tiqwa (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 232 days.

(21) Appl. No.: 17/215,809

(22) Filed: Mar. 29, 2021

(65) Prior Publication Data

US 2022/0311789 A1   Sep. 29, 2022

(51) Int. Cl.
| | |
|---|---|
| G06F 21/00 | (2013.01) |
| G06F 16/28 | (2019.01) |
| H04L 9/40 | (2022.01) |
| G06N 20/00 | (2019.01) |

(52) U.S. Cl.
CPC ........ *H04L 63/1425* (2013.01); *G06F 16/285* (2019.01); *H04L 63/1441* (2013.01); *G06N 20/00* (2019.01)

(58) Field of Classification Search
CPC ............. H04L 63/1425; H04L 63/1441; G06F 16/285; G06F 21/552; G06F 21/554; G06F 16/906; G06N 20/00
See application file for complete search history.

(56) References Cited

U.S. PATENT DOCUMENTS

| | | |
|---|---|---|
| 7,508,769 B1 | 3/2009 | Duffield et al. |
| 7,512,980 B2 | 3/2009 | Copeland et al. |
| 7,921,462 B2 | 4/2011 | Rooney et al. |

(Continued)

FOREIGN PATENT DOCUMENTS

| | | |
|---|---|---|
| CN | 103368979 B | 2/2015 |
| KR | 100974888 B1 | 8/2010 |

OTHER PUBLICATIONS

International Search Report and Written Opinion of International Searching Authority for PCT/IB2022/052894, ISA/IL, Jerusalem, Israel, Dated: Jun. 27, 2022.

(Continued)

*Primary Examiner* — Michael M Lee
(74) *Attorney, Agent, or Firm* — Perkins Coie LLP

(57) ABSTRACT

A system and method for detecting abnormal device traffic behavior. The method includes creating a baseline clustering model for a device based on a training data set including traffic data for the device, wherein the baseline clustering model includes a plurality of clusters, each cluster representing a discrete state and including a plurality of first data points of the training data set; sampling a plurality of second data points with respect to windows of time in order to create at least one sample, each sample including at least a portion of the plurality of second data points, wherein the plurality of second data points are related to traffic involving the device; and detecting anomalous traffic behavior of the device based on the at least one sample and the baseline clustering model.

18 Claims, 4 Drawing Sheets

(56) References Cited

U.S. PATENT DOCUMENTS

| | | | |
|---|---|---|---|
| 8,392,496 | B2 | 3/2013 | Linden et al. |
| 9,154,982 | B2 | 10/2015 | Chan et al. |
| 9,692,775 | B2 | 6/2017 | Zhang |
| 9,756,067 | B2* | 9/2017 | Boyadjiev ............ H04L 63/1441 |
| 10,318,886 | B2 | 6/2019 | Baradaran et al. |
| 10,909,470 | B2 | 2/2021 | Pietrobon et al. |
| 2016/0219067 | A1* | 7/2016 | Han et al. ............ H04L 63/1425 |
| 2017/0124478 | A1 | 5/2017 | Baradaran et al. |
| 2017/0208079 | A1 | 7/2017 | Cammarota et al. |
| 2019/0116193 | A1* | 4/2019 | Wang ...................... G06N 20/00 |
| 2019/0303710 | A1 | 10/2019 | Saha et al. |
| 2019/0372934 | A1* | 12/2019 | Yehudai .............. G06F 18/2321 |
| 2020/0106795 | A1* | 4/2020 | Servajean .............. G06N 3/045 |
| 2020/0112571 | A1 | 4/2020 | Koral et al. |
| 2020/0120144 | A1* | 4/2020 | Yadav ................ G06Q 20/4016 |
| 2020/0379868 | A1 | 12/2020 | Dherange et al. |
| 2021/0049270 | A1* | 2/2021 | Urmanov ............ G06F 18/2185 |
| 2021/0064593 | A1* | 3/2021 | Yeddu .................. G06F 16/285 |
| 2021/0126931 | A1* | 4/2021 | Babu ...................... G06N 3/044 |
| 2021/0133346 | A1* | 5/2021 | Alsharif ................ G06F 16/986 |
| 2021/0342207 | A1* | 11/2021 | Oliveri .................. G06F 21/552 |
| 2022/0086071 | A1* | 3/2022 | Sivaraman .......... H04L 63/1425 |

OTHER PUBLICATIONS

Andziński et al. Anomaly detection in DNS traffic, Clustering-based approach, Nov. 5, 2019, https://www.icann.org/sites/default/files/packages/ids-2019/05-andzinski-anomaly-detection-in-dns-traffic-11may19-en.pdf.

Rihan et al. Abnormal Network Traffic Detection based on Clustering and Classification Techniques: DoS Case Study, A Thesis Submitted in Partial Fulfillment of the Requirement for the Degree of Master in Information Technology https://library.iugaza.edu.ps/thesis/110094.pdf.

Extended European Search Report, from the European Patent Office (EPO), Application No. EP 22779275.1, dated Jul. 8, 2024, 7 pages.

* cited by examiner

SYSTEM AND METHOD FOR DETECTION OF ABNORMAL DEVICE TRAFFIC BEHAVIOR

TECHNICAL FIELD

The present disclosure relates generally to cybersecurity in network environments, and more specifically to detecting abnormal device behavior based on traffic related to such network environments.

BACKGROUND

As the number of connected devices accessing network environments continues to increase, network threats have become more commonplace and more sophisticated. Anomaly detection algorithms seek to autonomously learn and capture normal network behavior in order to distinguish deviations from the baseline without needing prior knowledge of the characteristics of an attack.

A reliable and extensive algorithm for detecting traffic-based anomalies over time needs to determine a baseline for normal activity of a device in order to provide a benchmark for comparison to subsequent activity used for identifying anomalous behavior. Using such a baseline, network traffic can be monitored and abnormal behavior can be detected, alerts can be generated, and mitigation actions may be taken. Techniques for new and more accurate definitions of baseline behavior are desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting abnormal device traffic behavior. The method comprises: creating a baseline clustering model for a device based on a training data set including traffic data for the device, wherein the baseline clustering model includes a plurality of clusters, each cluster representing a discrete state and including a plurality of first data points of the training data set; sampling a plurality of second data points with respect to windows of time in order to create at least one sample, each sample including at least a portion of the plurality of second data points, wherein the plurality of second data points are related to traffic involving the device; and detecting anomalous traffic behavior of the device based on the at least one sample and the baseline clustering model.

Certain embodiments disclosed herein also include a non-transitory computer readable medium having stored thereon causing a processing circuitry to execute a process, the process comprising: creating a baseline clustering model for a device based on a training data set including traffic data for the device, wherein the baseline clustering model includes a plurality of clusters, each cluster representing a discrete state and including a plurality of first data points of the training data set; sampling a plurality of second data points with respect to windows of time in order to create at least one sample, each sample including at least a portion of the plurality of second data points, wherein the plurality of second data points are related to traffic involving the device; and detecting anomalous traffic behavior of the device based on the at least one sample and the baseline clustering model.

Certain embodiments disclosed herein also include a system for detecting abnormal device traffic behavior. The system comprises: a processing circuitry; and a memory, the memory containing instructions that, when executed by the processing circuitry, configure the system to: create a baseline clustering model for a device based on a training data set including traffic data for the device, wherein the baseline clustering model includes a plurality of clusters, each cluster representing a discrete state and including a plurality of first data points of the training data set; sample a plurality of second data points with respect to windows of time in order to create at least one sample, each sample including at least a portion of the plurality of second data points, wherein the plurality of second data points are related to traffic involving the device; and detect anomalous traffic behavior of the device based on the at least one sample and the baseline clustering model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
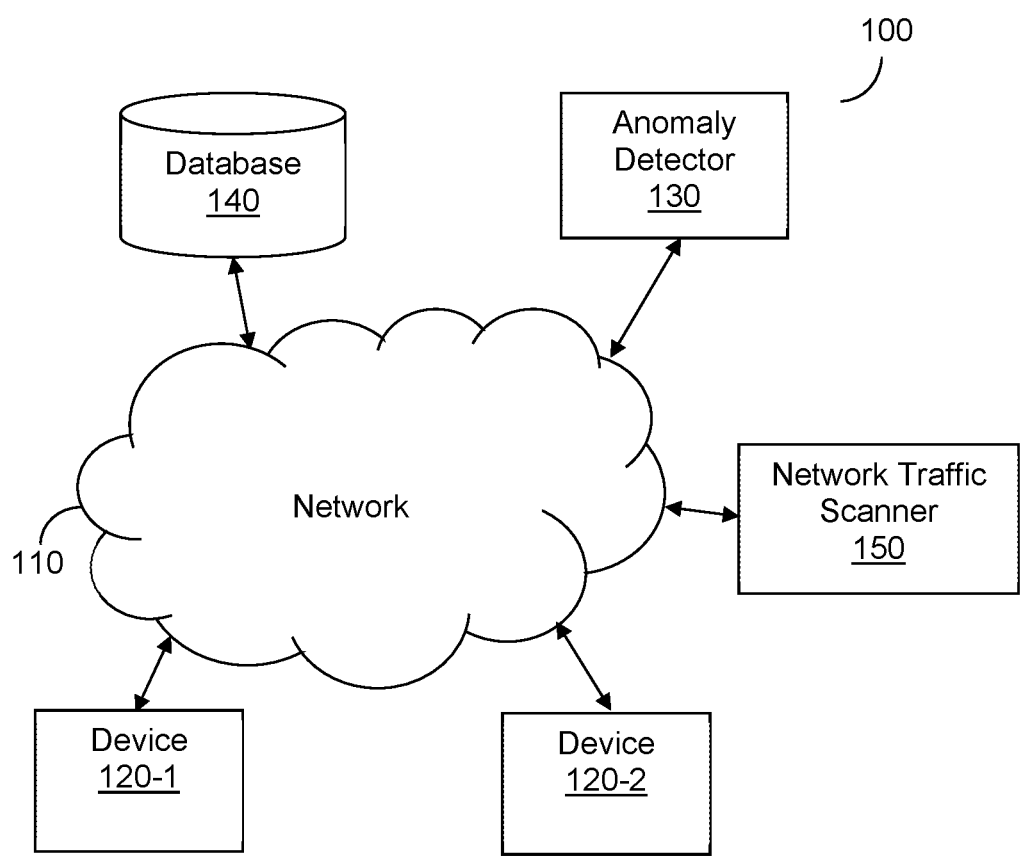
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting abnormal device traffic behavior which provide an improved definition of baseline and, therefore, allows for more accurately detecting potentially malicious behavior. In an embodiment, traffic data for a device is converted from a continuous stream to a finite set of discrete states. Each state characterizes a certain traffic pattern of the device such that different states reflect differing characteristics of traffic patterns. Baseline activity of a given device may be defined and monitored based on these states.

The disclosed embodiments further include techniques for creating and updating a model based on traffic behavior for a device. The training may include creating a k-means clustering model based on a training data set in order to result in a set of clusters representing discrete states. The model is updated based on subsequent data by either creating new clusters when an anomalous state is detected or appending the subsequent data to an existing cluster when the subsequent data is determined not to represent an anomalous state.

FIG. 1 shows an example network diagram 100 utilized to describe the various disclosed embodiments. In the example network diagram 100, communicating devices 120-1 and 120-2, an anomaly detector 130, a database 140, and a network traffic scanner 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the devices 120-1 and 120-2 may be, but is not limited to, a personal computer, a laptop, a tablet computer, a smartphone, a wearable computing device, a server, or any other device configured for communications which utilize one or more communications security protocols in order to secure those communications. As a non-limiting example, each of the devices 120-1 and 120-2 is configured to establish communication details using the transport layer security (TLS) protocol.

The anomaly detector 130 is configured to create a baseline model for the device 120-1, 120-2, or both, and to detect anomalies using such models. The anomaly detector 130 may be further configured to perform mitigation actions or to communicate with another system (not shown) configured to perform mitigation actions in order to send commands for performing mitigation actions based on detected anomalies.

The database 140 stores data to be utilized for training and application of the models as described herein. Such data may include, but is not limited to, contents of communications between the devices 120-1 and 120-2, contents of historical communications, discrete states, combinations thereof, and the like. In some embodiments, outputs of the inference generator (which may include intermediate outputs that are used as inputs to subsequent stages of processing) are stored in the database 140.

In some embodiments, the network traffic scanner 150 is configured to collect data about devices (e.g., the devices 120-1 and 120-2) accessing the network 110 or otherwise accessing a network environment. Such data includes data related to inbound and outbound traffic involving each device such as, but not limited to, inbound bytes count for traffic going into the device, outbound bytes count for traffic coming out of the device, and packets count for traffic going into and coming out of the device. In other embodiments, the anomaly detector 130 may be further configured to collect such data.

It should be noted that only two devices 120-1 and 120-2 are illustrated in FIG. 1 merely for simplicity purposes, but that the disclosed embodiments may be extended to higher numbers of devices without departing from the scope of the disclosure.

Figure 2:
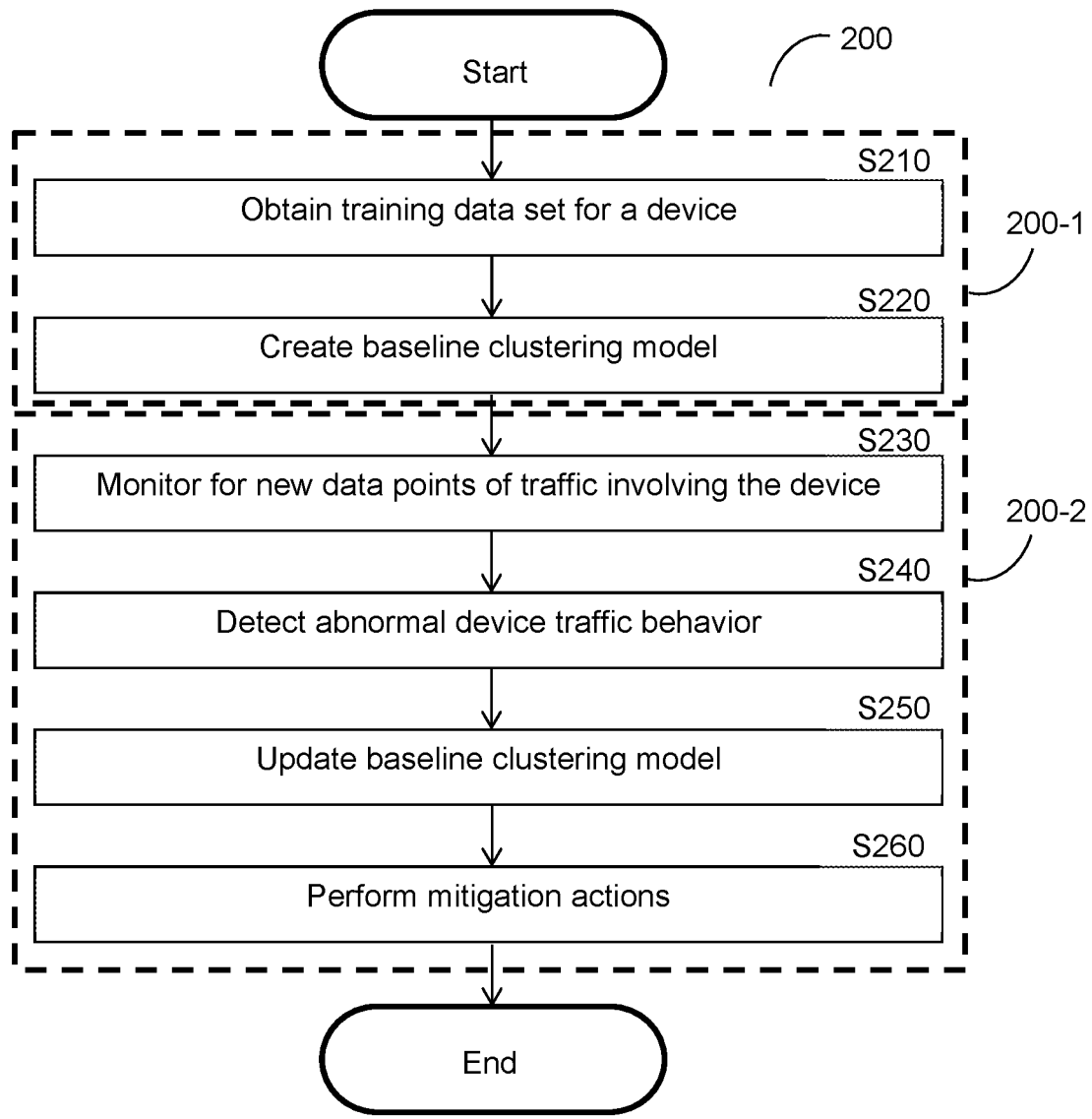
FIG. 2 is a flowchart illustrating a method for detecting abnormal device traffic behavior according to an embodiment.

FIG. 2 is a flowchart 200 illustrating a method for detecting abnormal device traffic behavior according to an embodiment. In an embodiment, the method is performed by the abnormality detector 130, FIG. 1.

In an embodiment, the method illustrated in FIG. 2 includes a training phase 200-1 and a test phase 200-2. During the training phase 200-1, a baseline behavior model is created for a device (e.g., one of the devices 120-1 or 120-2, FIG. 1). During the test phase 200-2, traffic of the device is monitored with respect to the baseline behavior model in order to detect and mitigate anomalies.

At S210, during a training phase, a training data set including training data is obtained for a device. In an embodiment, S210 includes collecting data from one or more systems deployed in a network environment that are configured to collect traffic data for devices accessing the network environment.

The training data set includes data related to traffic involving the device. Traffic involving a device may include inbound and outbound traffic for the device such as, but not limited to, inbound bytes count, outbound bytes count, and packets count. The training data is collected as a continuous data stream, i.e., the data includes observations (i.e., data points) which are not collected or otherwise organized in batches or other discrete groupings.

At S220, a clustering model is fitted over the training data set in order to result in a baseline clustering model. In an example implementation, the clustering model is a k-means clustering model. To this end, in such an implementation, S220 includes performing k-means clustering in order to partition n observations among the training data into k clusters such that each observation belongs to a respective cluster having the nearest mean to the value of the observation. Because the clustering model is fitted onto training data related to traffic for a device, each cluster therefore represents a discrete state characterizing a traffic pattern of the device.

In an embodiment, S220 further includes applying one or more clustering techniques in order to more accurately determine appropriate clusters and to validate the determined clusters. Such clustering techniques are applied in order to determine an optimal clustering configuration in which member of the same cluster lie in proximity to one another while members of different clusters are far away from each other. In an example implementation, the silhouette technique, the elbow method, or both, are applied.

The silhouette technique includes determining a silhouette value, which measures how similar an observation is to its respective cluster as compared to other clusters. The silhouette value may be determined based on a mean distance between the value of each observation in the cluster and all other observations in the cluster. A "high" silhouette value (e.g., a value above a predetermined threshold) indicates that the observation is well matched (i.e., close) to its own cluster, and if the majority of observations have high values, then the clustering model is determined as a good fit.

The elbow method can be used to determine the number of clusters to use for the training data set. The elbow method includes plotting the explained variation, which measures the proportion to which a mathematical model accounts for variation of a given data set, as a function of the number of clusters of the clustering model, and selecting the elbow of the curve (i.e., the point at which the curve changes from a high slope to a low slope or the point at which the curve changes direction) as the number of clusters to use. The elbow is visibly distinct when the curve is plotted out. In an embodiment, the elbow method is applied automatically and without manual intervention. In this regard, it is noted that any visible distinctions in the curve are described herein merely for explanatory purposes, and such visible distinctions are not used in accordance with various disclosed embodiments.

It should be noted that FIG. 2 depicts a single discrete training phase and a single discrete test phase for a single device merely for simplicity purposes, but that the disclosed training and test phases may each be performed iteratively, that each iteration may include either or both phases, and subsequent iterations including both phases may be performed in a different order than the order shown in FIG. 2. Additionally, models may be created for multiple devices in series or in parallel, and those models for multiple devices may be monitored in parallel without departing from the scope of the disclosed embodiments. At each iteration, a respective test phase may be performed for each device in order to monitor for anomalies in that device's traffic behavior.

At S230, during a test phase, new data points (i.e., data points collected after the training data) are monitored for. In an embodiment, S230 may include collecting or receiving such new data points (e.g., receiving data from the network traffic scanner 150, FIG. 1). The new data points include, but are not limited to, inbound bytes count data points, outbound bytes count data points, and packets count data points. In an embodiment, the new data points include the types of features used for training during the training phase and the same types of features are used for both the training and test phases. Each new data point may further be associated with a timestamp indicating a respective time, for example, the time at which the data point was collected, which can be utilized in order to organize the new data points with respect to time.

At S240, the new data points are analyzed in order to determine whether each data point is anomalous and, based on the analysis abnormal traffic behavior is detected. In an embodiment, the new data points are sampled with respect to windows of time, and the samples (groupings of new data points within respective windows of time) are compared to clusters of the clustering model. In a further embodiment, anomalous data points are determined as described further with respect to FIG. 3.

Figure 3:
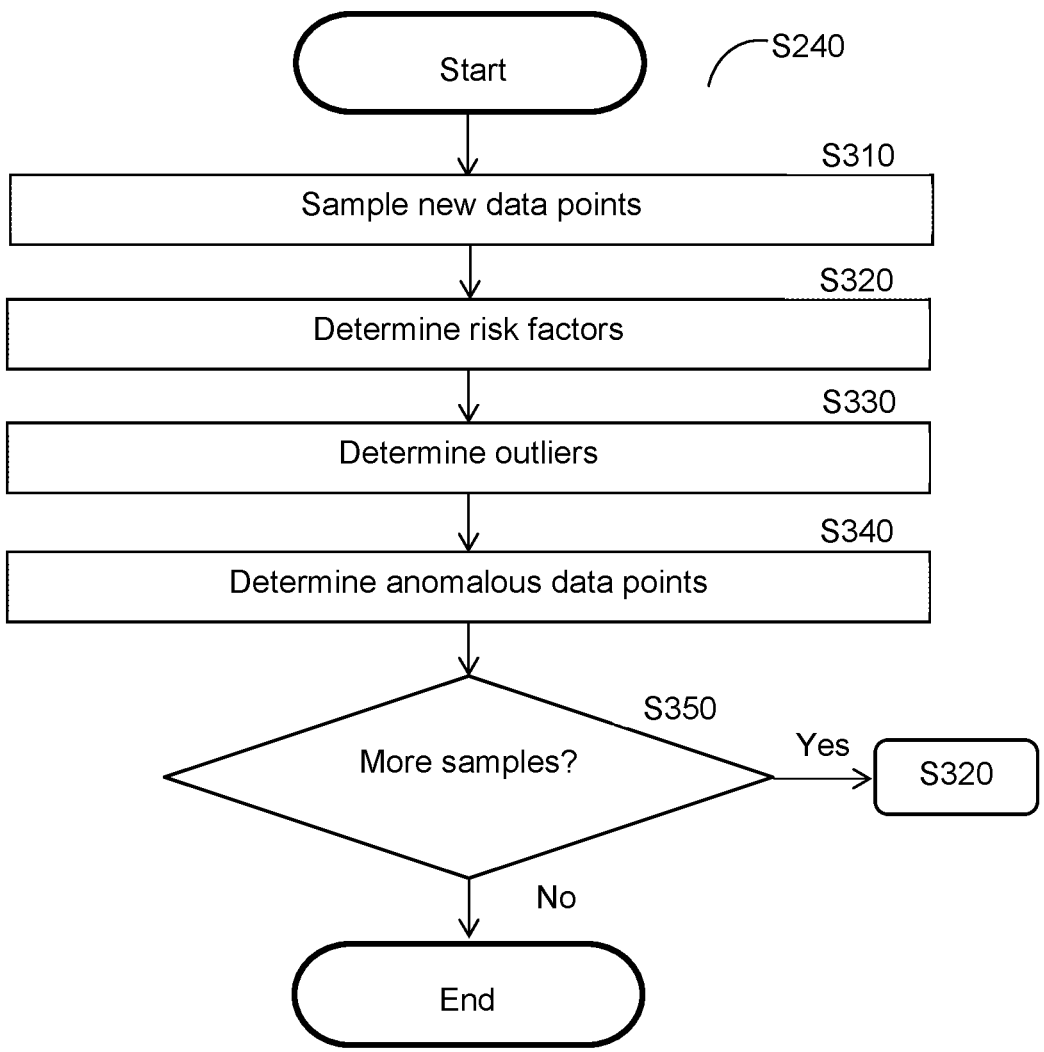
FIG. 3 is a flowchart illustrating a method for determining anomalous data points according to an embodiment.

FIG. 3 is a flowchart S240 illustrating a method for determining anomalous data points in device traffic according to an embodiment. In an embodiment, the method is performed to determine if new data points are anomalous using a previously created baseline clustering model.

At S310, the new data points are sampled with respect to windows of time in order to result in features to be utilized for determining risk factors. Each sample is a group of data points collected or otherwise within a given window of time. One or more respective features are determined for each sample. The determined features may include, but are not limited to, statistical values representing aspects of inbound and outbound traffic such as, but not limited to, number of inbound bytes, number of outbound bytes, and number of packets sent during the given window of time. As a non-limiting example, the new data points may be sampled using 10 minute windows such that each sample includes data points collected during its respective window, and the features determined for each sample include the number of inbound bytes during that 10 minute window, the number of outbound bytes during that 10 minute window, and the number of packets sent during the 10 minute window.

At S320, for each data point of a sample, a risk factor is determined for the data point based on a vector representation of the data point (hereinafter the data point vector) in a traffic feature space (i.e., the feature space of the new data points including all data points collected through the training phase and up until the collection of the most recently collected new data points) and its proximity to an existing cluster in the baseline clustering model. In an embodiment, the proximity is determined with respect to the closest cluster, e.g., the cluster whose mean values (i.e., the means of the corresponding entries of each vector representation) are closest to respective values of the vector representation of the data point.

In an embodiment, the risk factors are determined based on properties including the norm of data point vector, the length of the projection of the data point vector over the centroid of the closest cluster, and the length of the projection of the data point vector over a diagonal vector of the traffic feature space. These properties are translated into a scalar value referred to as a risk factor that reflects the distance of the data point from the device's baseline activity. Consequently, the risk factor can be used to determine the amount of risk posed by any given deviation.

At S330, for each data point of the sample, it is determined whether the data point is an outlier. Whether a data point is an outlier may be determined based on the clusters of the baseline clustering model. To this end, in an example implementation, local outlier factoring is applied over the clusters and the data point being analyzed in order to determine whether the data point is an outlier with respect to one of the clusters.

At S340, one or more anomalous data points are identified based on the risk factors and the outlier determinations. In an embodiment, a data point is anomalous when the data point is both determined to be an outlier and is high risk. To this end, in some embodiments, S330 further includes comparing the risk factor for each data point to a threshold in order to determine whether the data point is high risk (e.g., above the threshold) or low risk (e.g., below the threshold). The threshold may be a particular value for risk factor, or may be a proportion relative to previous risk factor values (e.g., based on a mean or a highest value among previous risk factor values). The threshold may be predetermined and may be initially set to a default value, and may be adjusted based on subsequently determined risk factors as described further below.

At S350, it is determined whether additional samples are to be analyzed and, if so, execution continues with S320; otherwise, execution terminates.

Returning to FIG. 2, at optional S250, the baseline clustering model may be updated based on the analysis of the new data points. In an embodiment, the clustering model is updated by integrating each sample of data points that is not determined to be anomalous into an existing cluster of the baseline clustering model and by adding the sample as a new cluster when it is determined to be anomalous.

In a further embodiment, S250 may also include updating the threshold used to determine risk. For example, the precision of anomaly detection may be improved by raising the threshold so that fewer false positive anomalies are detected. As noted above, the threshold may be a threshold value or a proportion relative to a risk factor value (e.g., a proportion of 1.3 such that a high risk factor is a risk factor having a value that is at least 1.3 times the value of the highest risk factor thus far). As a non-limiting example, the threshold proportion may be raised from 1.2 to 1.3 such that the value required to identify high risk is higher.

In yet a further embodiment, the threshold may be updated based on changes in the precision of anomaly detection over time. To this end, the threshold may be updated periodically or when the precision of anomaly detection has changed at least by a predetermined amount or proportion. The precision of anomaly detection may be determined by statistical analysis of prior anomaly detections under the previous threshold, for example, based on the number of anomalies detected using the disclosed techniques as compared to the number of "actual" anomalies which occurred during the same period of time (as a non-limiting example, the number of "actual" anomalies may be a number determined by an admin or other operator).

At S260, one or more mitigation actions are performed. In an embodiment, for each data point which is determined to be anomalous, one or more mitigation actions are determined and implemented. The mitigation actions may include, but are not limited to, generating an alert, disabling traffic to the device, disabling traffic from the device, terminating a connection between the device and one or more other networks or systems, combinations thereof, and the like.

Figure 4:
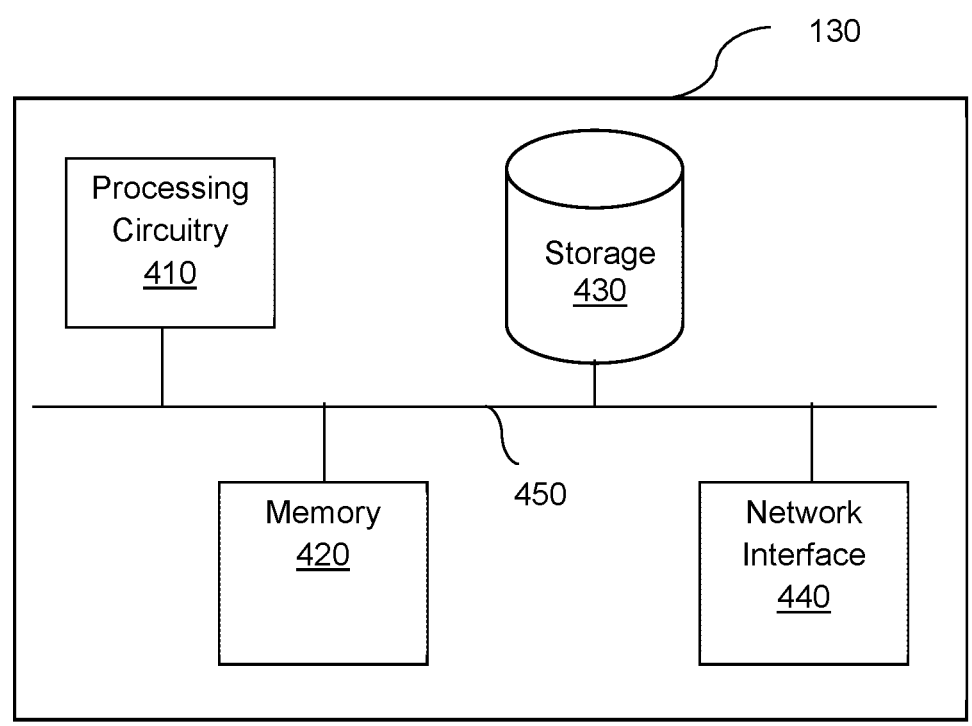
FIG. 4 is a schematic diagram of an abnormality detector according to an embodiment.

FIG. 4 is an example schematic diagram of an anomaly detector 130 according to an embodiment. The anomaly detector 130 includes a processing circuitry 410 coupled to a memory 420, a storage 430, and a network interface 440. In an embodiment, the components of the anomaly detector 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk—read only memory (CD-ROM), Digital Versatile Disks (DVDs), or any other medium which can be used to store the desired information.

The network interface 440 allows the anomaly detector 130 to communicate with, for example, the devices 120-1 ad 120-2, the database 140, or both.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method, comprising:
    creating a baseline clustering model specific to a device based on a training data set including traffic data for the device, wherein the baseline clustering model includes a plurality of clusters, each cluster of the plurality of clusters representing a discrete state and including a plurality of first data points of the training data set;
    sampling a plurality of second data points with respect to windows of time thereby creating at least one sample, each sample of the at least one sample including at least a portion of the plurality of second data points, wherein the plurality of second data points are related to traffic involving the device;

calculating, for each second data point of the plurality of second data points in the at least one sample, a risk factor score based on a vector representation of the respective second data point in a traffic feature space and a proximity of the respective second data point to one of the plurality of clusters in the baseline clustering model specific to the device;

determining, for each second data point in the at least one sample, whether the respective second data point is an outlier based on the plurality of clusters in the baseline clustering model specific to the device;

detecting anomalous traffic behavior of the device by identifying a second data point in the at least one sample as an anomalous data point based on the risk factor score of that second data point and that second data point being a determined outlier;

updating the plurality of clusters of the baseline clustering model based on the at least one sample and the risk factor score for each second data point of each sample, wherein the updating comprises adding each sample having a high risk factor score as a new cluster to the plurality of clusters; and performing at least one mitigation action based on the detected anomalous traffic behavior.

2. The method of claim 1, wherein the detecting the anomalous traffic behavior further comprises:

for each second data point of each sample, determining whether the second data point is an outlier with respect to one of the plurality of clusters, wherein the anomalous traffic behavior is detected further based on at least one outlier second data point of the plurality of second data points.

3. The method of claim 1, wherein the risk factor score for each second data point in the plurality of second data points is determined based on a vector representation of the second data point in a traffic feature space and a proximity of the second data point to one of the plurality of clusters.

4. The method of claim 3, wherein the risk factor score is determined further based on a norm of the vector representation of the second data point, a length of a projection of the vector representation over a centroid of closest cluster of the plurality of clusters, and a length of the projection over a diagonal vector of the traffic feature space.

5. The method of claim 1, wherein the updating the plurality of clusters further comprises:

integrating each sample having a risk factor score below a threshold into one of the plurality of clusters.

6. The method of claim 1, wherein the detecting the anomalous traffic behavior further comprises:

comparing the risk factor score of each second data point of each sample to a threshold thereby determining whether the respective second data point for the risk factor score is high risk, wherein the respective second data point is high risk when the risk factor score for the respective second data point is above the threshold.

7. The method of claim 6, further comprising:

updating the threshold based on the detected anomalous traffic behavior.

8. The method of claim 6, wherein the threshold is a proportional value of a highest risk factor score among each second data point of each sample.

9. A non-transitory computer readable medium having stored thereon instructions for causing a processing circuitry to execute a process, the process comprising:

creating a baseline clustering model specific to a device based on a training data set including traffic data for the device, wherein the baseline clustering model includes a plurality of clusters, each cluster of the plurality of clusters representing a discrete state and including a plurality of first data points of the training data set;

sampling a plurality of second data points with respect to windows of time thereby creating at least one sample, each sample of the at least one sample including at least a portion of the plurality of second data points, wherein the plurality of second data points are related to traffic involving the device;

calculating, for each second data point of the plurality of second data points in the at least one sample, a risk factor score based on a vector representation of the respective second data point in a traffic feature space and a proximity of the respective second data point to one of the plurality of clusters in the baseline clustering model specific to the device;

determining, for each second data point in the at least one sample, whether the respective second data point is an outlier based on the plurality of clusters in the baseline clustering model specific to the device;

detecting anomalous traffic behavior of the device by identifying a second data point in the at least one sample as an anomalous data point based on the risk factor score of that second data point and that second data point being a determined outlier;

updating the plurality of clusters of the baseline clustering model based on the at least one sample and risk factor score for each second data point of each sample, wherein the updating includes adding each sample having a high risk factor score as a new cluster to the plurality of clusters; and performing at least one mitigation action based on the detected anomalous traffic behavior.

10. The non-transitory computer readable medium of claim 9, wherein the process further comprises:

for each second data point of each sample, determine whether the second data point is an outlier with respect to one of the plurality of clusters, wherein the anomalous traffic behavior is detected further based on at least one outlier second data point of the plurality of second data points.

11. A system for detecting abnormal device traffic behavior, comprising:

a processing circuitry; and a memory, the memory containing instructions that, when executed by the processing circuitry, configure the system to:

create a baseline clustering model specific to a device based on a training data set including traffic data for the device, wherein the baseline clustering model includes a plurality of clusters, each cluster of the plurality of clusters representing a discrete state and including a plurality of first data points of the training data set;

sample a plurality of second data points with respect to windows of time thereby creating at least one sample, each sample of the at least one sample including at least a portion of the plurality of second data points, wherein the plurality of second data points are related to traffic involving the device;

calculate, for each second data point of the plurality of second data points in the at least one sample, a risk factor score based on a vector representation of the respective second data point in a traffic feature space and a proximity of the respective second data point to one of the plurality of clusters in the baseline clustering model specific to the device;

determine, for each second data point in the at least one sample, whether the respective second data point is an outlier based on the plurality of clusters in the baseline clustering model specific to the device;

detect anomalous traffic behavior of the device by identifying a second data point in the at least one sample as an anomalous data point based on the risk factor score of that second data point and that second data point being a determined outlier;

update the plurality of clusters of the baseline clustering model based on the at least one sample and the risk factor score for each second data point of each sample, wherein the update includes adding each sample having a high risk factor score as a new cluster to the plurality of clusters; and performing at least one mitigation action based on the detected anomalous traffic behavior.

12. The system of claim 11, wherein the system is further configured to:

for each second data point of each sample, determine whether the second data point is an outlier with respect to one of the plurality of clusters, wherein the anomalous traffic behavior is detected further based on at least one outlier second data point of the plurality of second data points.

13. The system of claim 11, wherein the risk factor score for each second data point in the plurality of second data points is determined based on a vector representation of the second data point in a traffic feature space and a proximity of the second data point to one of the plurality of clusters.

14. The system of claim 11, wherein the system is further configured to:

integrate each sample having a risk factor score below a threshold into one of the plurality of clusters.

15. The system of claim 11, wherein the system is further configured to:

compare the risk factor score of each second data point of each sample to a threshold thereby determining whether the respective second data point for the risk factor score is high risk, wherein the respective second data point is high risk when the risk factor score for the respective second data point is above the threshold.

16. The system of claim 15, wherein the system is further configured to:

update the threshold based on the detected anomalous traffic behavior.

17. The system of claim 15, wherein the threshold is a proportional value of a highest risk factor score among each second data point of each sample.

18. The system of claim 13, wherein the risk factor score is determined further based on a norm of the vector representation of the second data point, a length of a projection of the vector representation over a centroid of closest cluster of the plurality of clusters, and a length of the projection over a diagonal vector of the traffic feature space.

* * * * *